United States Patent
Kludt et al.

(10) Patent No.: US 9,210,672 B2
(45) Date of Patent: *Dec. 8, 2015

(54) METHOD AND APPARATUS FOR RANDOM ACCESS CHANNEL PROBE INITIALIZATION USING TRANSMIT DIVERSITY

(71) Applicant: GOOGLE INC., Mountain View, CA (US)

(72) Inventors: Kenneth Kludt, San Jose, CA (US); Haim Harel, New York, NY (US); Phil F. Chen, Denville, NJ (US); Sherwin J. Wang, Towaco, NJ (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/249,551

(22) Filed: Apr. 10, 2014

(65) Prior Publication Data

US 2014/0233486 A1 Aug. 21, 2014

Related U.S. Application Data

(63) Continuation of application No. 13/117,005, filed on May 26, 2011, now Pat. No. 8,731,489, which is a continuation of application No. 12/042,560, filed on Mar. 5, 2008, now Pat. No. 8,046,017.

(60) Provisional application No. 61/348,672, filed on May 26, 2010, provisional application No. 60/918,068, filed on Mar. 15, 2007.

(51) Int. Cl.
*H04B 1/02* (2006.01)
*H04W 52/54* (2009.01)
(Continued)

(52) U.S. Cl.
CPC .............. *H04W 52/54* (2013.01); *H04B 7/0877* (2013.01); *H04W 52/0241* (2013.01);
(Continued)

(58) Field of Classification Search
CPC .......... H04B 7/0877; H04B 7/02; H04B 7/06; H04B 7/0602; H04B 7/0404; H04B 7/0604; H04B 7/0606; H04B 7/0608; H04W 52/0241; H04W 52/146; H04W 52/325; H04W 52/367; H04W 52/42; H04W 52/48
USPC ......... 455/73, 522, 3.01, 101, 91, 515, 115.1, 455/69, 70, 450, 127.3, 574, 703, 277.1, 455/272, 272.2, 552.1, 127.5, 103; 370/280, 297, 281, 276, 329; 375/219, 375/299, 259

See application file for complete search history.

(56) References Cited

U.S. PATENT DOCUMENTS 5,642,353 A   6/1997   Roy, III et al.
5,832,044 A   11/1998  Sousa et al.
(Continued)

FOREIGN PATENT DOCUMENTS

EP   0986193   3/2000
EP   1282242   2/2003
(Continued)

OTHER PUBLICATIONS

Derryberry et al., "Transmit Diversity in 3G COMA Systems", Wideband Wireless Access Technologies to Broadband Internet, IEEE Communications Magazine, Apr. 2002, pp. 68-75.
(Continued)

*Primary Examiner* — Tan H Trinh
(74) *Attorney, Agent, or Firm* — Troutman Sanders LLP; James E. Schutz; Christopher Close, Jr.

(57) ABSTRACT

Embodiments of the present invention may separately utilize transmit paths of a mobile transmit diversity device to initialize communication with a base station over a random access channel, particularly where the transmit paths have power amplifiers with different characteristics, e.g., different power amplification.

20 Claims, 10 Drawing Sheets

(51) Int. Cl.
*H04B 7/08* (2006.01)
*H04W 52/02* (2009.01)
*H04W 52/14* (2009.01)
*H04W 52/32* (2009.01)
*H04W 52/42* (2009.01)
*H04W 52/48* (2009.01)
*H04W 52/50* (2009.01)
*H04W 52/36* (2009.01)
*H04W 74/08* (2009.01)

(52) U.S. Cl.
CPC ........ *H04W 52/146* (2013.01); *H04W 52/325* (2013.01); *H04W 52/42* (2013.01); *H04W 52/48* (2013.01); *H04W 52/50* (2013.01); *H04W 74/0833* (2013.01); *H04W 52/367* (2013.01); *H04W 74/0866* (2013.01); *Y02B 60/50* (2013.01)

(56) References Cited

U.S. PATENT DOCUMENTS

| | | | |
|---|---|---|---|
| 5,983,112 | A | 11/1999 | Kay |
| 5,991,330 | A | 11/1999 | Dahlman et al. |
| 5,999,826 | A | 12/1999 | Whinnett |
| 6,185,440 | B1 | 2/2001 | Barratt et al. |
| 6,226,509 | B1 | 5/2001 | Mole et al. |
| 6,236,363 | B1 | 5/2001 | Robbins et al. |
| 6,330,294 | B1 | 12/2001 | Ansbro et al. |
| 6,343,218 | B1 | 1/2002 | Kaneda et al. |
| 6,392,988 | B1 | 5/2002 | Allpress et al. |
| 6,492,942 | B1 | 12/2002 | Kezys |
| 6,636,495 | B1 | 10/2003 | Tangermann |
| 6,704,370 | B1 | 3/2004 | Chheda et al. |
| 6,745,009 | B2 | 6/2004 | Raghothaman |
| 6,754,473 | B1 | 6/2004 | Hwang et al. |
| 6,810,264 | B1 | 10/2004 | Park et al. |
| 6,859,643 | B1 | 2/2005 | Ma et al. |
| 6,882,228 | B2 | 4/2005 | Rofougaran |
| 7,058,400 | B2 | 6/2006 | Brooks |
| 7,321,636 | B2 | 1/2008 | Harel et al. |
| 7,327,801 | B2 | 2/2008 | Harel et al. |
| 7,515,559 | B2 | 4/2009 | Koo et al. |
| 7,660,598 | B2 | 2/2010 | Barnett et al. |
| 7,729,714 | B2 | 6/2010 | Black et al. |
| 7,792,207 | B2 | 9/2010 | Harel et al. |
| 7,813,753 | B2 | 10/2010 | Santhanam |
| 2003/0002594 | A1 | 1/2003 | Harel et al. |
| 2003/0112880 | A1 | 6/2003 | Walton et al. |
| 2003/0207668 | A1* | 11/2003 | McFarland et al. .......... 455/3.01 |
| 2004/0048584 | A1 | 3/2004 | Vaidyanathan et al. |
| 2004/0082356 | A1 | 4/2004 | Walton et al. |
| 2004/0085239 | A1 | 5/2004 | Ukena et al. |
| 2005/0059355 | A1 | 3/2005 | Liu |
| 2005/0143113 | A1 | 6/2005 | Lee et al. |
| 2006/0226903 | A1* | 10/2006 | Muller et al. ................ 330/149 |
| 2007/0004343 | A1* | 1/2007 | Kandola et al. ................ 455/73 |
| 2007/0149235 | A1 | 6/2007 | Chin et al. |
| 2008/0227406 | A1 | 9/2008 | Kludt et al. |
| 2008/0259861 | A1 | 10/2008 | Kang et al. |
| 2009/0209214 | A1* | 8/2009 | Harel et al. ................ 455/127.3 |
| 2012/0009968 | A1* | 1/2012 | Kludt et al. .................... 455/522 |
| 2012/0243447 | A1* | 9/2012 | Weissman et al. ............ 370/280 |
| 2014/0135056 | A1* | 5/2014 | Wang ............................ 455/522 |
| 2014/0205042 | A1* | 7/2014 | Kludt et al. .................... 375/299 |

FOREIGN PATENT DOCUMENTS

| | | |
|---|---|---|
| EP | 1282244 | 2/2003 |
| EP | 1284545 | 2/2003 |
| EP | 1262031 | 5/2004 |
| GB | 2353437 | 2/2001 |
| JP | 09-238098 | 9/1997 |
| JP | 2000-151484 | 5/2000 |
| WO | 97/24818 | 7/1997 |
| WO | 99/31799 | 6/1999 |
| WO | 00/79701 | 12/2000 |
| WO | 01/31802 | 5/2001 |
| WO | 01/69814 | 9/2001 |
| WO | 03/090386 | 10/2003 |
| WO | 2004/045108 | 5/2004 |
| WO | 2005/081444 | 9/2005 |
| WO | 2006-124951 | 11/2006 |
| WO | 2007/092896 | 8/2007 |
| WO | 2008/113039 | 9/2008 |

OTHER PUBLICATIONS

Rashid-Farrokhi, et al., "Transmit Beamforming and Power Control for Cellular Wireless Systems", IEEE Journal on Selected Areas in Communications, vol. 16, No. 8, Oct. 1998, pp. 1437-1450.

Lim et al., "3rd Generation Rach Transmission-A Candidate", 1999 IEEE 49th Vehicular Technology Conference, Houston, Texas, May 16-20, 1999; [IEEE Vehicular Technology Conference], New York, NY: IEEE, US, vol. Coni. 49, May 16, 1999, pp. 140-144.

International Search Report for International Application No. PCT/US2008/057120 mailed Aug. 22, 2008.

International Search Report for International Application No. PCT/US2011/038221 mailed Aug. 3, 2011.

* cited by examiner

METHOD AND APPARATUS FOR RANDOM ACCESS CHANNEL PROBE INITIALIZATION USING TRANSMIT DIVERSITY

CROSS-REFERENCE TO RELATED APPLICATIONS

This application claims benefit of U.S. Provisional Patent Application Ser. No. 61/348,672, entitled "Method and Apparatus for Random Access Channel Probe Initialization Using Transmit Diversity" and filed May 26, 2010, the entirety of which is incorporated by reference herein.

This application is a continuation-in-part application of U.S. application Ser. No. 12/042,560, filed Mar. 5, 2008, and entitled Method and Apparatus for Random Access Channel Probe Initialization Using Transmit Diversity, the entire contents of which are hereby incorporated by reference.

FIELD OF THE INVENTION

This invention relates generally to the field of wireless communications and more specifically to controlling transmit diversity parameters prior to and during connection of a transmit diversity mobile communication device to a base station.

BACKGROUND OF THE INVENTION

In transmit diversity systems, one of the advantageous features of a mobile transmit diversity communication device is an extension of operating range. This effect may be an outcome of forming a beam that exhibits a higher Effective Radiated Power (ERP) than a conventional transmitter that does not employ transmit diversity. This advantageous feature may be enhanced by a successful and/or efficient beamforming process, for instance, in a closed loop mechanism, on the provision of feedback from the receiver to the transmit diversity transmitter.

Generally, in systems of communication between a mobile handset, for example, a mobile telephone, personal digital assistant (PDA), laptop computer, etc. and a base station over a random access channel, there is typically a protocol for the mobile device to initiate communication with the base station. Typically, the mobile device will attempt to access a network by emitting an access probe, also known as a pre-amble signal. If no response is received from the base station, the mobile device may repeat transmission of the access probe with increased power, and repeat increasing power of the probes until an end condition is reached. An end condition may be receiving acknowledgement, or it may be when the maximum allowed probe power is reached, or when the maximum allowed number of probes is sent. If an acknowledgment is not received, the mobile device will typically declare the access attempt a failure and try again, either automatically or manually.

Therefore, in cellular communication systems, the mobile transmitter may begin a registration process to the network, but the base station has not yet registered the existence of the mobile transmitter. In some implementations of transmit diversity, the transmitter may require feedback from the receiver, e.g., a base station, in order to optimally adjust a phase difference or other diversity parameter. However, in the absence of successful registration, the base station may not provide the feedback required to close the loop, as is advantageous for purposes of transmit diversity. This lack of feedback may render inefficient the proper beamforming resultant ERP and reduce the potential range extension. This effect may be further adversely affected by the usage of multiple sub-power power amplifiers, which may possibly be used for saving or reducing current consumption, when beamforming is successfully implemented.

As described in prior patent applications of the assignee of the present invention, a mobile transmit diversity (MTD) device may use two antennas simultaneously transmitting with a transmit diversity parameter, for example, a phase difference or a power ratio between at least two antennas. In one embodiment, two "diversity power amplifiers" may be used to save the current consumption for the mobile device, as described, for example, in US Patent Publication No. 2003/0002594, the entire contents of which are incorporated herein by reference. Use of mobile transmit diversity may permit extending the effective range of a mobile device from a base station using the same power as a non-diverse transmission device.

The maximum power of this diversity power amplifier can be half or even quarter of the maximum power of the "regular" power amplifier. However, when a mobile transmitter accesses the wireless network, it may need the maximum power from the mobile power amplifier to get base station's attention (e.g., at the cell edge). There is therefore a need for an efficient initial negotiation process for a mobile transmit diversity communication device.

SUMMARY OF EMBODIMENTS OF THE INVENTION

Embodiments of the invention may provide a device and method of initiating communication between a mobile communication device and a second communication device. A method may include transmitting from the mobile communication device at least a first probe signal on a random access channel using only a first transmit path of the mobile communication device, said first transmit path including a low power amplifier, and if acknowledgement is not received from the second communication device in response to said first probe signal, then transmitting from the mobile communication device at least a second probe signal on a random access channel using only a second transmit path of the mobile communication device, said second transmit path including a high power amplifier.

According to some embodiments of the invention, a substantially maximum efficiency of the low power amplifier may substantially coincide with half of a specification power limit of the mobile communication device. According to some embodiments of the invention, a substantially maximum efficiency of the low power amplifier may substantially coincide with the full specification power limit of the mobile communication device.

According to some embodiments of the invention, transmitting at least said first probe signal using said first transmit path may comprise transmitting from the mobile communication device a first sequence of first probe signals using only the first transmit path of the mobile communication device, wherein probe signals in the first sequence have increasing power relative to previous probe signals in the first sequence until a specification allowed transmission power of the low power amplifier is reached.

According to some embodiments of the invention, transmitting at least said second probe signal using said second transmit path may comprise transmitting from the mobile communication device a second sequence of second probe signals using only the second transmit path of the mobile communication device, wherein probe signals in the second sequence have increasing power relative to previous probe signals in the second sequence until a specification allowed transmission power of the high power amplifier is reached.

According to some embodiments of the invention, if acknowledgement is not received from the second communication device in response to said second probe signal, then the mobile communication device may transmit at least a third probe signal on a random access channel using at least first and second transmit paths simultaneously, wherein transmissions of the third probe signal on the first and second transmit paths differ by a value of a transmit diversity parameter. According to some embodiments of the invention, the mobile communication device may transmit a third sequence of third probe signals using the first and second transmit paths of the mobile communication device simultaneously, wherein probe signals in the third sequence have different values of the transmit diversity parameter. According to some embodiments of the invention, the transmit diversity parameter is a phase difference.

According to some embodiments of the invention, a transmission power of the second probe signal may be greater than a transmission power of the first probe signal. According to some embodiments of the invention, in which a first sequence of first probe signals using only the first transmit path of the mobile communication device is transmitted, and a second sequence of second probe signals using only the second transmit path of the mobile communication device is transmitted, the probe signals in the second sequence have power equal to or greater than the probe signals in the first sequence.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

Embodiments of the invention may be used in communication systems in connection with mobile transmit diversity devices. A communication system may include a mobile transmitter, also referred to as a modifying communication device, that adjusts a nominal value of a transmit diversity parameter, for example, a phase difference and/or a power ratio between a signal transmitted on a first antenna and a second antenna. Although the embodiments described in the present application are described as using two antennas, it will be recognized that the present invention is equally applicable to transmit diversity systems and devices having more than two antennas.

The present invention may be applicable in any communication network that uses a random access channel to initiate communication between a mobile device and a second communication device, including but not limited to a base station. Networks may utilize communication protocols and technologies to provide the communication sessions. Examples of communication protocols and technologies include those set by the Institute of Electrical and Electronics Engineers, Inc. (IEEE) 802.xx standards, International Telecommunications Union (ITU-T) standards, European Telecommunications Standards Institute (ETSI) standards, Internet Engineering Task Force (IETF) standards, or other standards.

Communication devices in a network may use any suitable multiple access technology, for example, a code division multiple access (CDMA) technology. According to one embodiment, the network may operate according to a CDMA 2000 telecommunications technology that uses a single CDMA channel. As an example, a CDMA 2000 high rate data packet technology, such as the Evolution Data Optimized (EvDO) technology may be used.

The network may comprise any suitable communication network. A communication network may comprise all or a portion of a public switched telephone network (PSTN), a public or private data network, a local area network (LAN), a metropolitan area network (MAN), a wide area network (WAN), a global computer network such as the Internet, a wireless network, a local, regional, or global communication network, an enterprise intranet, other suitable communication link, or any combination of the preceding.

A component of network, for example, a mobile communication device, may include logic, an interface, memory, other component, or any suitable combination of the preceding. "Logic" may refer to hardware, software, other logic, or any suitable combination of the preceding. Certain logic may manage the operation of a device, and may comprise, for example, a processor. "Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise a Random Access Memory (RAM), a Read Only Memory (ROM), a magnetic drive, a disk drive, a Compact Disk (CD) drive, a Digital Video Disk (DVD) drive, a removable media storage, any other suitable data storage medium, or a combination of any of the preceding.

The communication network may include one or more mobile or modifying communication devices and one or more other communication devices, for example base stations, that communicate via a wireless link. A mobile communication device unit may comprise any device operable to communicate with a base station, for example, a personal digital assistant (PDA), a cellular telephone, a mobile handset, a laptop computer, or any other device suitable for communicating signals to and from a base station. A subscriber unit may support, for example, Session Initiation Protocol (SIP), Internet Protocol (IP), or any other suitable communication protocol.

A base station may provide a subscriber unit access to a communication network that allows the subscriber unit to communicate with other networks or devices. A base station typically includes a base transceiver station and a base station controller. The base transceiver station communicates signals to and from one or more subscriber units. The base station controller manages the operation of the base transceiver station.

According to embodiments of the invention, the mobile communication device may include two or more antenna elements, where each antenna element is operable to receive, transmit, or both receive and transmit a signal. Multiple antenna elements may provide for a separation process known as spatial filtering, which may enhance spectral efficiency, allowing for more users to be served simultaneously over a given frequency band.

As described more fully below, according to embodiments of the present invention, the mobile communication device may include a processor and a transmit/receive module that calculate and produce one or more signals for transmission over at least first and second antennas.

According to one embodiment, modifying a signal may refer to modifying a signal feature. For example, a signal may be transmitted by the two antennas using a modified signal feature, or a different value of a transmit diversity parameter. A transmission signal feature, or in some embodiments of the invention, a transmit diversity parameter, may refer without limitation to any feature of the transmission, for example, relative phase, relative amplitude, relative power, absolute power, frequency, timing, other suitable signal feature that may be modulated, or any combination of the preceding. Relative phase may refer to the phase difference between the phase of a first signal of a first transmit antenna element and the phase of a second signal of a second transmit antenna element. Relative power may refer to the ratio between the power of a first signal of a first transmit antenna element and the power of a second signal of a second transmit antenna element, which ratio may be defined on a linear or logarithmic scale. Relative amplitude may refer to the ratio between the amplitude of a first signal of a first transmit antenna element and the amplitude of a second signal of a second transmit antenna element. Absolute power may refer to the total power transmitted by all antennas of modifying communication device. According to one embodiment, modifying a signal may be described as adjusting a nominal value of a transmit diversity parameter.

According to embodiments of the invention, transmit diversity may be used to efficiently negotiate initial contact with a base station even substantially without a transmission quality feedback signal from the base station pertaining to the transmit diversity. A diversity parameter may be a parameter distinguishing between the transmission on any two antennas, for example a difference in transmission phase on the two antennas, or a ratio of transmission power on the two antennas. It will be understood that although examples are provided in the present application pertaining to phase difference between two antennas, the invention is applicable using the same principles to varying any transmit diversity parameter, including power ratio, during initial negotiation with the base station on a random access channel.

Figure 1:
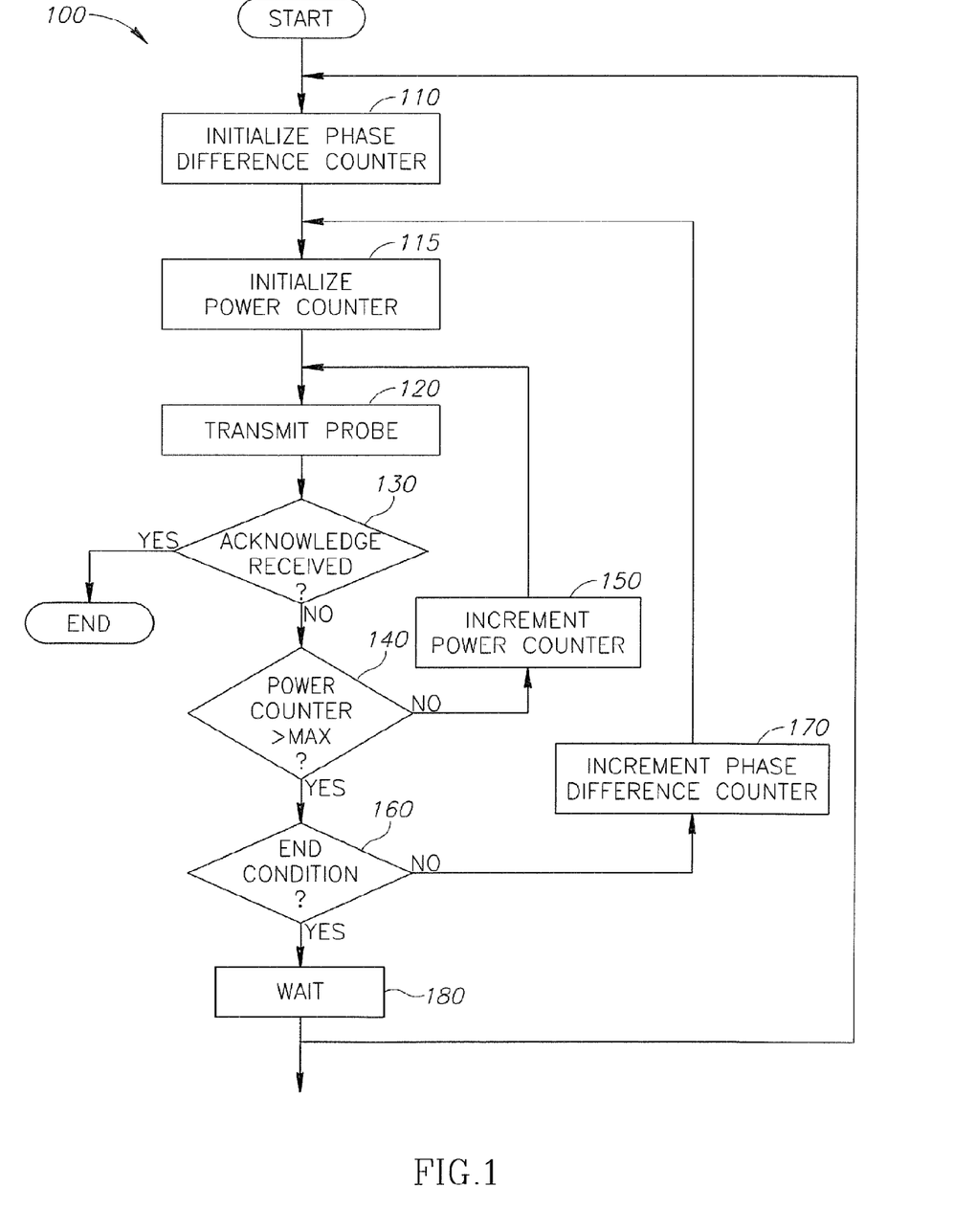
FIG. 1 is a schematic flow chart diagram of a method in accordance with embodiments of the present invention.
Figure 2:
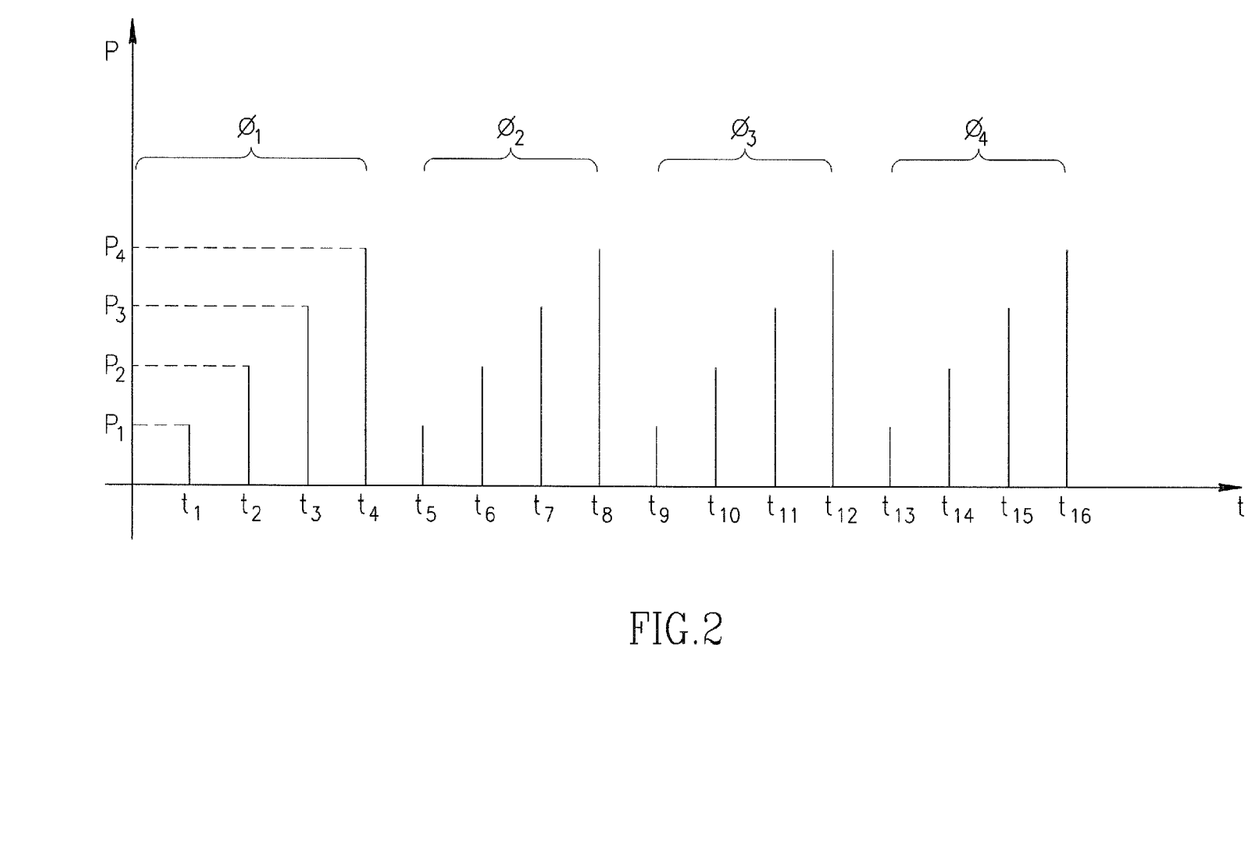
FIG. 2 is a schematic time diagram of a sequence of probe signals according to embodiments of the present invention.

FIG. 2 is a schematic flow diagram of a method 100 in accordance with an embodiment of the invention. A phase difference counter may be initialized (110). An initial value for the phase difference may be any arbitrary initial value, but typically not 180 degrees. A power setting counter may be initialized (115). Power may be initialized to a suitable low power setting in accordance with the relevant protocol. Either or both of the counters may be a parameter or an actual value.

Using these initial values, a probe may be transmitted (120). At step 130, if acknowledgement is received from the base station, the initialization may end and regular transmission of data signals may proceed; otherwise, a power counter may be assessed to determine if other power settings may be attempted (140). If the maximum value of the power counter has not been reached, the power counter or value may be incremented (150) and a transmit probe sent using the revised power setting (120). The power counter may be incremented by a pre-defined value or increment.

Upon reaching a maximum limit for power setting, for example, a maximum power allowed by the system, or a maximum number of attempts allowed, it may optionally be determined whether an end condition has been reached, for example, a maximum total number of probe transmissions, or a total number of phase differences totaling a multiple of 360°, before indicating failure. Alternately, the end condition may be omitted and the method may proceed directly to step 170, for example, after waiting a brief period. If no end condition has been reached, the phase difference counter may be incremented (170), for example, as calculated to optimize probability of improving transmission. In one embodiment, the phase difference increment may be, for example, 100 degrees. The power counter may be re-initialized (115), and a probe transmitted with the new values (120). If an end condition has been reached, the method may wait in accordance with the protocol requirements (180), and the method may be restarted with initial parameters (110). It will be recognized that in some embodiments of the invention, phase difference counter may not be initialized, but the phase difference may simply continue, and accordingly, the loop may return at 115. In some embodiments of the invention, the phase difference counter may only be initialized upon powering up or turning on the mobile transmitter.

FIG. 2 depicts a sequence of probe transmissions in accordance with the present invention. At time t1, a probe is transmitted at a first power level P1 and at a first phase difference φ1. Upon failing to receive acknowledgement, the transmitter transmits probes having phase difference φ1 and with power settings P2, P3 and P4. In the embodiment depicted, after the probe at time t4 is transmitted, the power counter has reached the maximum, and without any acknowledgment, the transmitter proceeds to transmit probe having power level P1 and phase difference φ2. When acknowledgment is not received, probes are sent with power differences P2, P3 and P4 and phase difference φ2. This process may repeat until acknowledgment is received or a maximum number of phase differences, e.g., 360° rotation is reached and exhausted without acknowledgement.

It will be recognized that by varying phase difference, an optimal phase difference may be obtained, or if not, the power may be increased accordingly. That is, changing phase difference may have the effect of changing the orientation of the signal beam and eventually reaching the base station with the enough transmit power. In an embodiment of the invention, the amount of the increment in phase difference may be chosen such that the phase difference between the two paths will not be repeated within several access procedures, e.g., six procedures.

Figure 3:
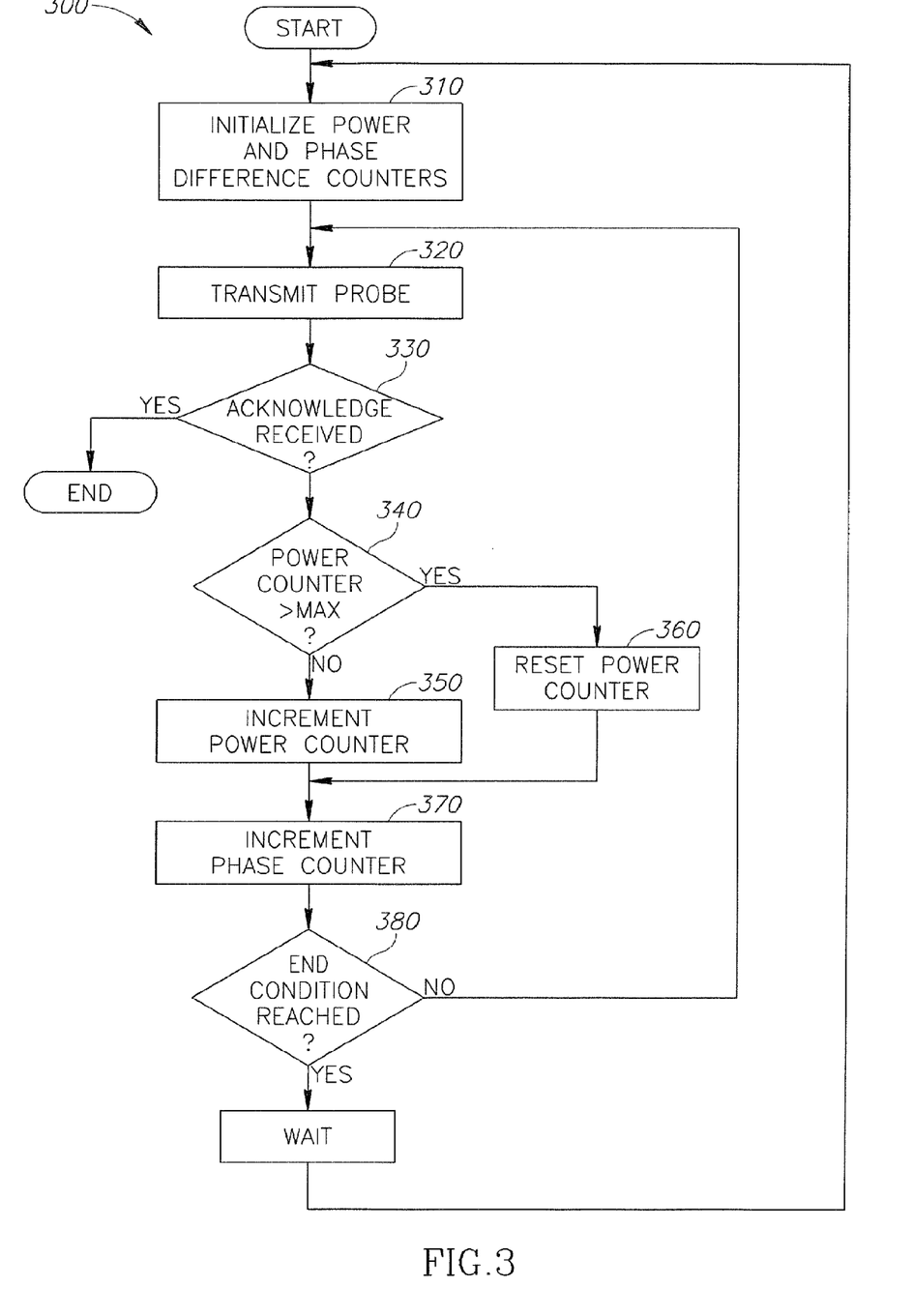
FIG. 3 is a schematic flow chart diagram of a method in accordance with embodiments of the present invention.

FIG. 3 is a schematic flow diagram of a method 300 in accordance with an embodiment of the invention. Power and phase difference values or counters may be initialized at the start of the method (310). An initial phase difference may be any arbitrary initial value, but typically not 180 degrees. Power may be initialized to a suitable low power setting in accordance with the relevant protocol.

Using these initial values, a probe may be transmitted (320). At step 330, if acknowledgement is received from the base station, the initialization may end and regular transmission of data signals may proceed; otherwise, a power setting counter may be assessed to determine if other power settings may be attempted (340). If the maximum value of the power setting counter has not been reached, the power setting counter or value may be incremented (350); if the maximum power setting counter has been reached, the power counter may be reset (360). Then, the phase difference may be incremented by a pre-defined value that may optimize probability of improving transmission (370). In one embodiment, the phase difference increment may be, for example, 100 degrees.

It may be determined whether a maximum or end condition has been reached, for example, whether power and phase difference settings have been exhausted (380). If not, a probe may be transmitted (320) with the newly adjusted values for phase difference and power.

Figure 4:
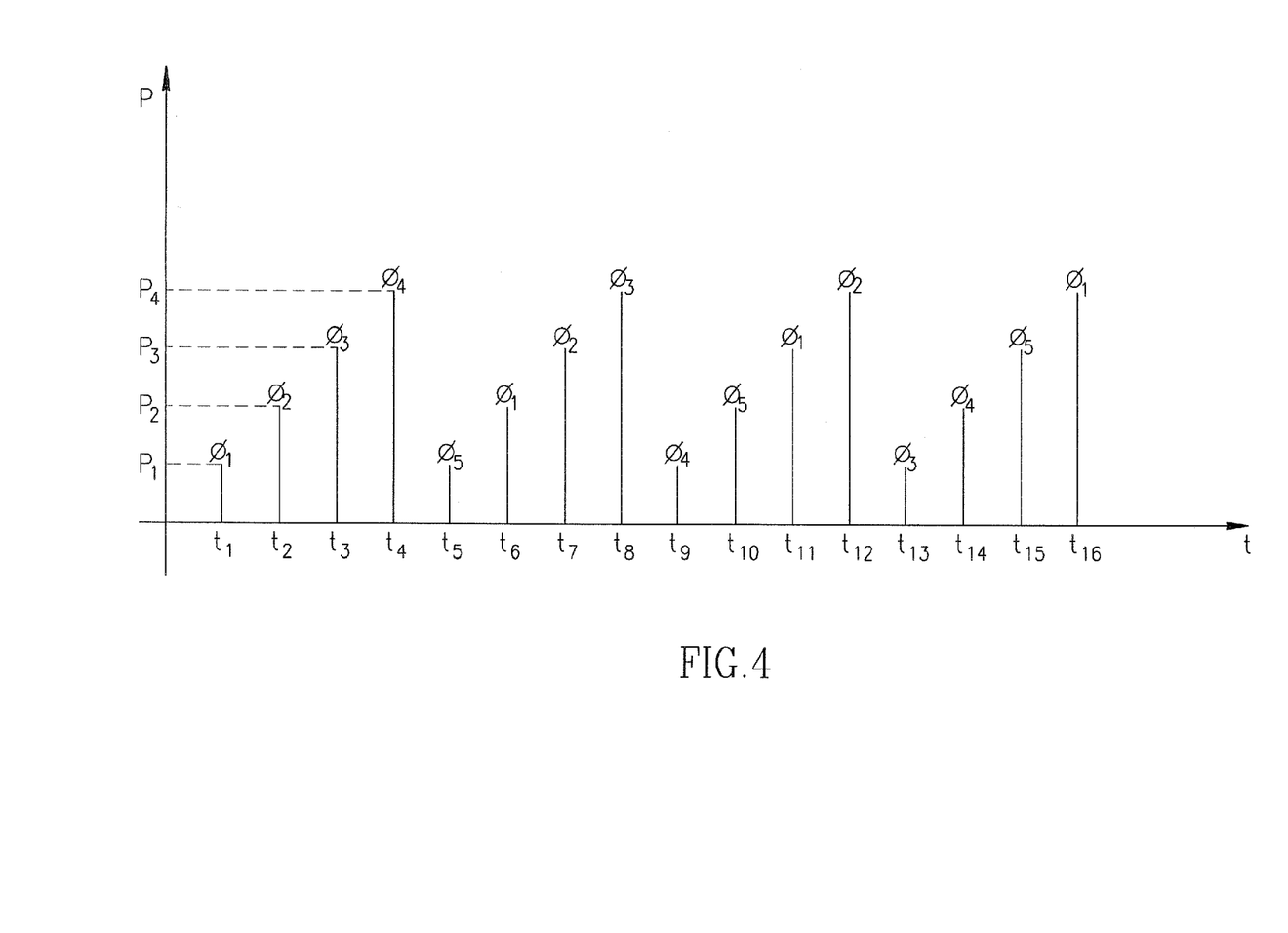
FIG. 4 is a schematic time diagram of a sequence of probe signals according to embodiments of the present invention.

FIG. 4 depicts a sequence of probe transmissions in accordance with the present invention. At time t1, a probe is transmitted at a first power level P1 and at a first phase difference φ1. Upon failing to receive acknowledgement, the transmitter transmits probes having power P2, and with phase difference φ2. Then, upon failing to receive acknowledgment, the transmitter may transmit probe having power P3 and phase difference φ3, etc. It will be recognized that in the embodiment depicted, the phase difference and power levels have different periodicities in order not to repeat the same power and phase difference settings. It will be recognized that many other periodicities may be implemented within the scope of the present invention.

Figure 5:
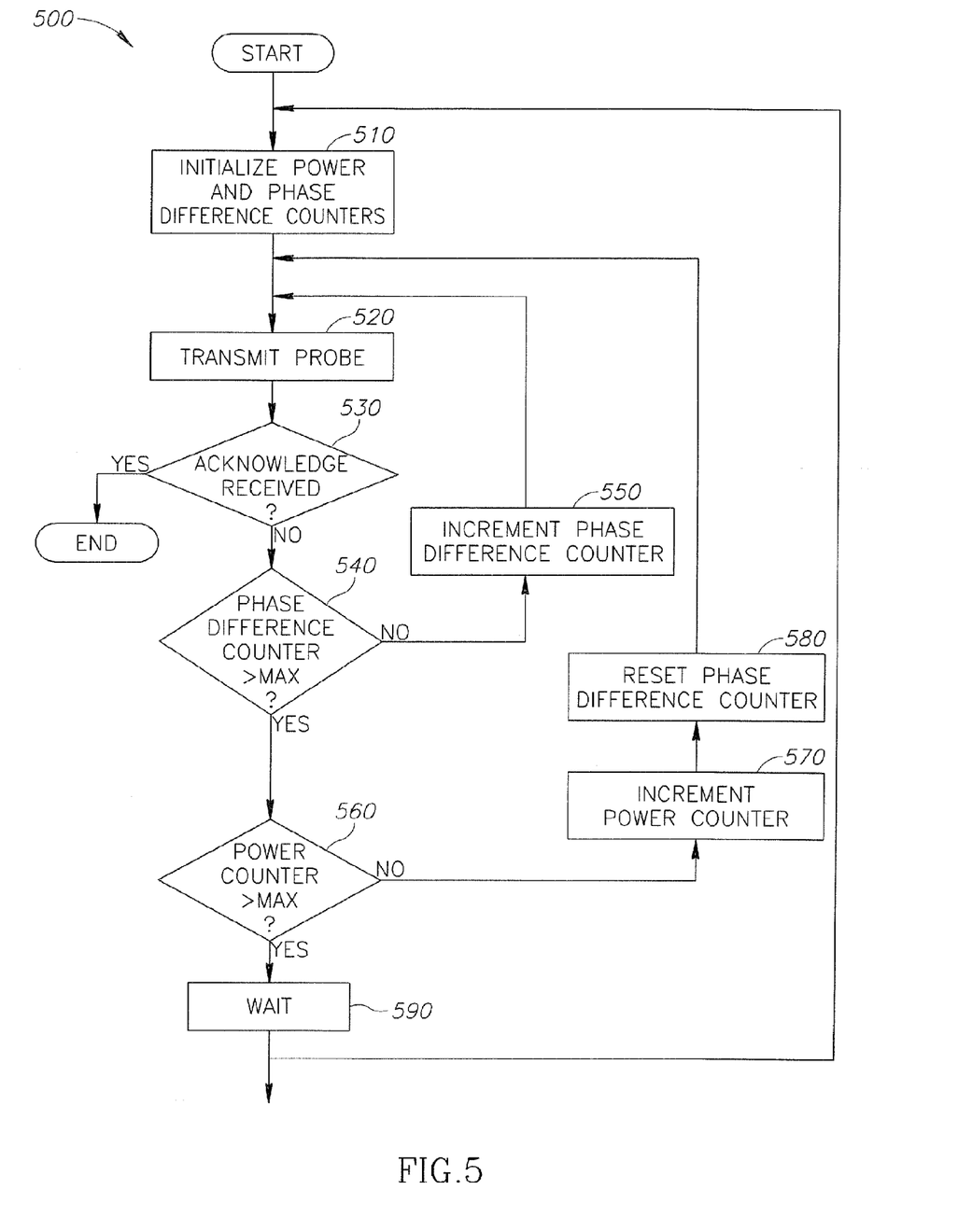
FIG. 5 is a schematic flow chart diagram of a method in accordance with embodiments of the present invention.

FIG. 5 is a schematic flow diagram of a method 500 in accordance with an embodiment of the invention. Power and phase difference values or counters may be initialized at the start of the method (510). An initial phase difference may be any arbitrary initial value, but typically not 180 degrees. Power may be initialized to a suitable low power setting in accordance with the relevant protocol.

Using these initial values, a probe may be transmitted (520). At step 530, if acknowledgement is received from the base station, the initialization may end and regular transmission of data signals may proceed; otherwise, a phase difference counter may be assessed to determine if other phase differences may be attempted (540). If the maximum value of the phase difference counter has not been reached, the phase difference counter or value may be incremented (550) and a transmit probe sent using the revised phase difference (520). The phase difference may be incremented by a pre-defined value that may optimize probability of improving transmission. In one embodiment, the phase difference increment may be, for example, 100 degrees.

Upon reaching a maximum limit for phase difference adjustments, for example, a maximum number of attempts at the given power, it may be determined whether the power has reached a maximum value (560). If not, the power may be incremented (570), the phase difference counter may be reset if relevant (580), and a probe transmitted with the new values (520). If the maximum power or other condition has been reached, the method may wait in accordance with the protocol requirements (590), and the method restarted with initial parameters (510).

Figure 6:
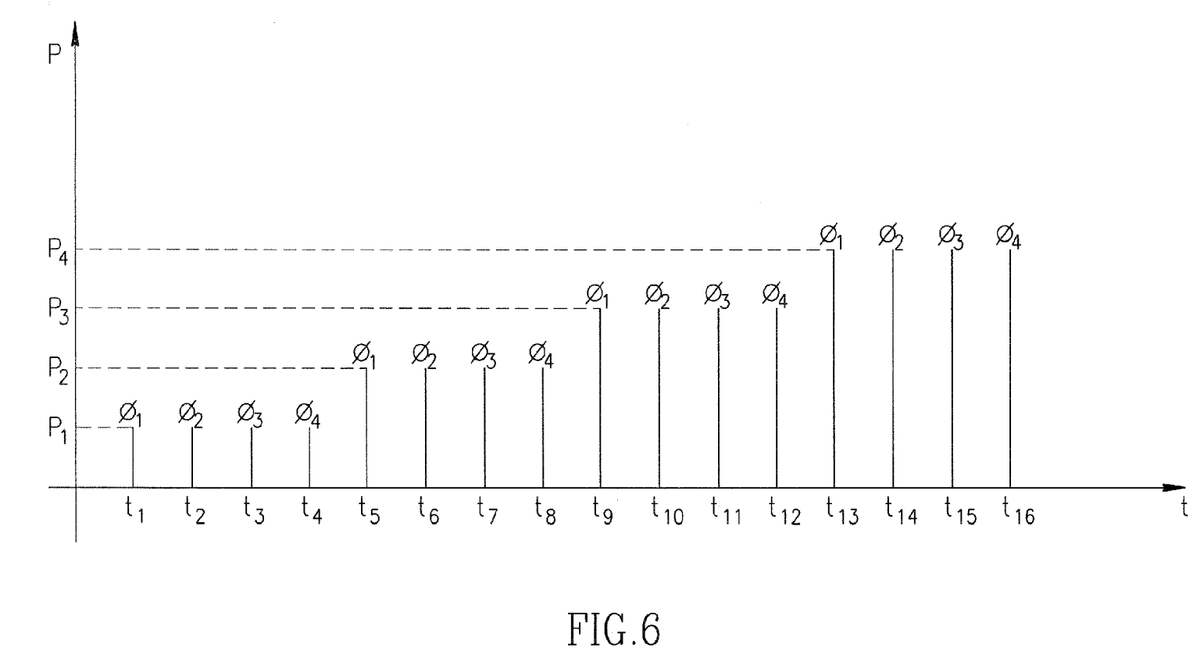
FIG. 6 is a schematic time diagram of a sequence of probe signals according to embodiments of the present invention.

FIG. 6 depicts a sequence of probe transmissions in accordance with the present invention. At time t1, a probe is transmitted at a first power level P1 and at a first phase difference φ1. Upon failing to receive acknowledgement, the transmitter transmits probes having power P1, and with phase differences φ2, φ3, and φ4. In the embodiment depicted, after probe φ4, the phase increment counter has reached the maximum, and without any acknowledgment, the transmitter proceeds to transmit probe having power level P2 and phase difference φ1. When acknowledgment is not received, probes are sent with power level P2 and phase differences φ2, φ3, and φ4. This process may repeat until acknowledgment is received or a maximum power level, e.g., P4 is reached and exhausted.

Figure 7:
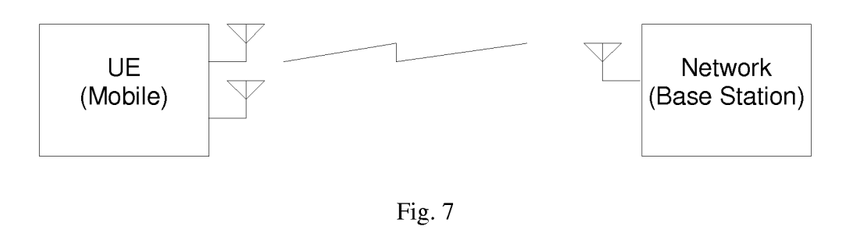
FIG. 7 is a schematic diagram of a system according to embodiments of the invention.

FIG. 7 is a schematic diagram of a system according to an embodiment of the invention. FIG. 7A depicts a user equipment (UE) mobile communication device having a plurality of antennas in wireless communication with a base station.

In some embodiments of the invention, the mobile device may include two or more transmit paths, or channels, each associated with a respective transmit antenna. Such a transmit path may include, for example, an RF power amplifier, and a transmit antenna. One or more of the transmit paths may include a diversity parameter adjustment module, e.g., a phase modulator if the transmit diversity parameter is a relative phase.

Figure 8:
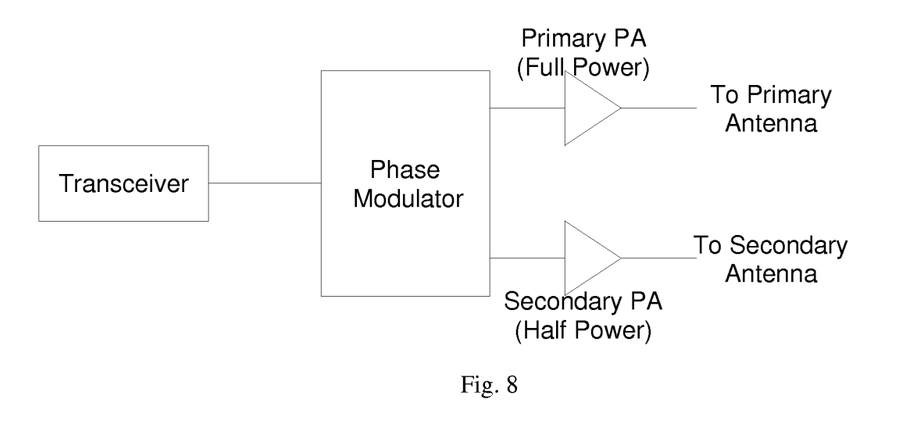
FIG. 8 is a schematic diagram of a device according to an embodiment of the invention.

FIG. 8 is a schematic diagram of a device according to an embodiment of the invention. As shown, the mobile communication device may include a transceiver and at least two transmit paths, each associated with a power amplifier and an antenna. The device may include a diversity parameter modulator, e.g., a phase modulator, which may be associated with one or more transmit paths.

In some embodiments of the invention, the power amplifiers on the respective transmit paths may have the same transmit power, e.g., each may be rated for a fraction (e.g., half or quarter) of the specification power limit of the device as a whole based on its class. As described below, the mobile communication device may attempt to register first using one fractional power amplifier, and then (if not successful) using the other fractional power amplifier, and then (if still not successful), using both fractional power amplifiers in transmit diversity, as described above. In such embodiments, although the equivalent isometric radiated power (EIRP) may not necessarily be increased by transmitting over one transmit path or the other, because of spatial diversity, e.g., one antenna may be better situated relative to the other, one antenna may nevertheless have a better path to the base station. Although additional embodiments of the invention described below refer to a high power amplifier and a low power amplifier, or a full-power and half-power amplifier, it will be understood that the methods described are fully applicable to embodiments having a plurality of power amplifiers having the same amplification characteristics.

In some embodiments of the invention, the power amplifiers in the transmit paths may be rated for a different output power. For example, a first power amplifier in a first transmit path may be rated to transmit a high power and a second power amplifier in a second transmit path may be rated to produce a lower power. More specifically, as depicted an embodiment of the invention shown in FIG. 8, the first power amplifier may be rated to transmit a full power allocated to the device unit of its class, e.g., +24 dBm, and be connected to the primary antenna, and the second power amplifier may be rated to transmit a fraction, e.g., half, of the full power allocated to the device unit of its class, e.g., +21 dBm, and be connected to the secondary antenna.

It will be recognized that in some embodiments of the invention, the initial phase difference selected may be such that the signals arrive at the base station in a destructive manner, resulting in a higher power (i.e., amplification power) than necessary before the signal is suitably received and acknowledged at the base station. Such high power transmissions may disturb other non-serving base stations near the mobile communication device. According to a method in accordance with embodiments of the invention, the mobile device may initially transmit probes using the low power transmit path including the low power amplifier, e.g., up to half the module rated power using the half-power amplifier. If the mobile device fails to receive an acknowledgement from the base station using the low power amplifier, the device may repeat the registration attempts using the high power transmit path, e.g., up to the full module rated power using the full-power amplifier. If the mobile device fails to receive an acknowledgement from the base station using the high power amplifier, the device may enable transmit diversity operation and attempt to register with the base station as described in the previous embodiments, transmit diversity. In some embodiments of the invention, using the half-power amplifier may afford the mobile device power consumption efficiency when operating where only lower powers are needed.

It will be recognized that when employing transmit diversity, the base station may receive a signal power level approximately equal to effective power Pe, where Pe=Pt+Gd, where Pt is the total power transmitted by the mobile, and Gd is the diversity gain provided by transmitting more than one signal. If the mobile device is transmitting at the maximum power allowed by its class, the range from the base station with which it can operate satisfactorily may be extended past a non-diversity mobile device because of the diversity gain Gd.

Figure 9:
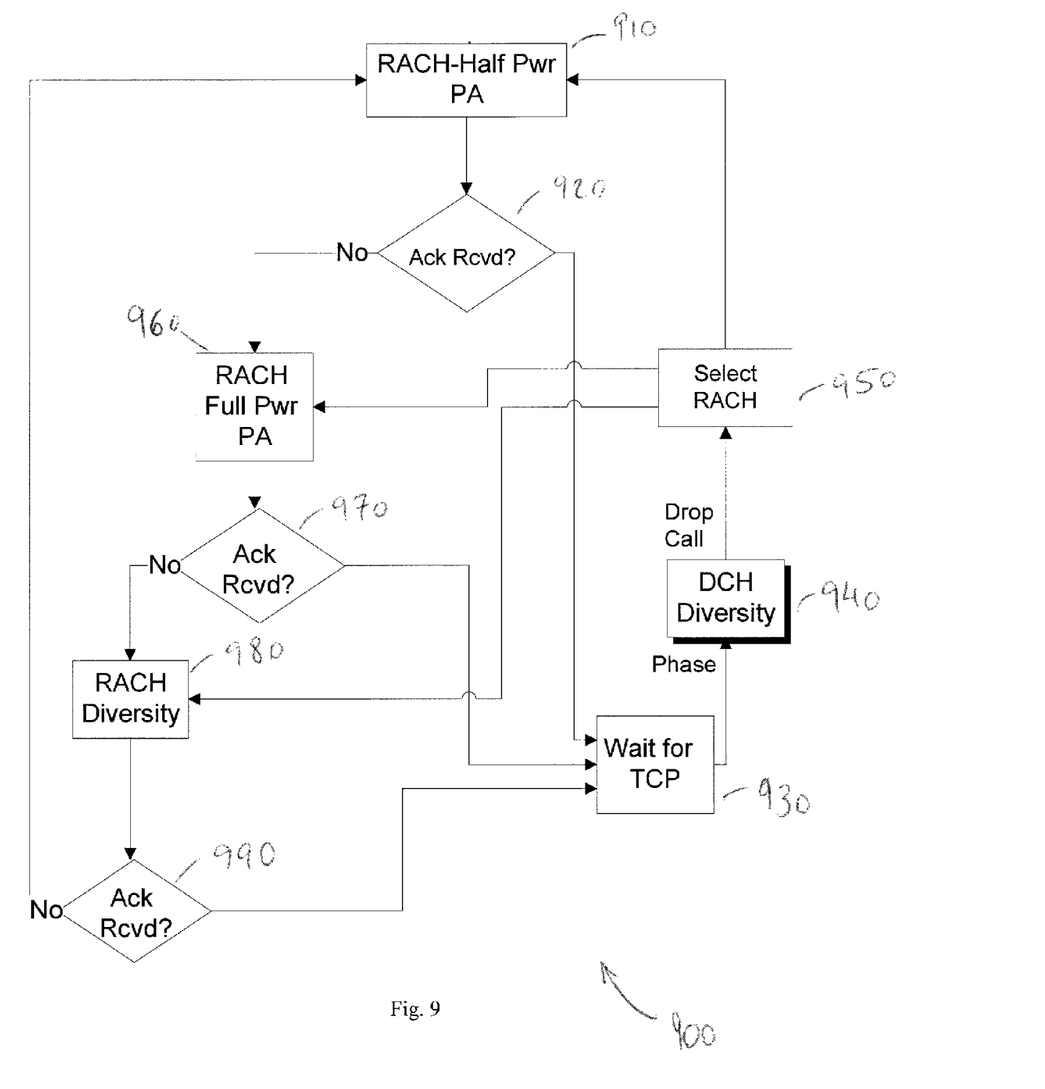
FIG. 9 is a schematic flow chart diagram of a method in accordance with an embodiment of the present invention.

FIG. 9 is as schematic flow diagram of a method 900 in accordance with an embodiment of the invention. A mobile communication device may transmit a random access channel (RACH) probe using a half-power amplifier on a first transmit path (910). If the base station acknowledges the probe (920), the mobile device may wait for a TCP signal from the base station (930), and commence normal communication over a data channel using the two antennas in transmit diversity (940).

If no acknowledgement to the probe sent using the half-power amplifier is received (920), the mobile device may proceed to transmit a random access channel (RACH) probe using a full-power amplifier on a second transmit path (960). If the base station acknowledges the probe (970), the mobile device may wait for a TCP signal from the base station (930), and commence normal communication over a data channel using the two antennas in transmit diversity (940).

If no acknowledgement to the probe sent using the full-power amplifier is received (970), the mobile device may proceed to transmit a random access channel (RACH) probe using a both amplifiers in transmit diversity, as described above, e.g., using a difference in phase or other transmit diversity parameter (980). If the base station acknowledges the transmit diversity probe (990), the mobile device may wait for a TCP signal from the base station (930), and commence normal communication over a data channel using the two antennas in transmit diversity (940).

In some embodiment of the invention, after commencing normal data communication, if the call is dropped, a random access channel may be selected (950), and a probe may be transmitted using any of the half-power amplifier (910), the full power amplifier (960), or both using transmit diversity (990). In some embodiments of the invention, the mobile device may store the last successful probe configuration (e.g., which of the half-power, full-power, or both amplifiers, was used), and employ that amplifier(s) for a probe after communication with the base station was dropped.

It will be noted that in some embodiments, probes transmitted by the half-power, full-power or both amplifiers together, e.g., blocks 910, 960, and 990, may in fact include a plurality of probe signals, e.g., having increased power, and/or in the case of both amplifiers together, having different transmit diversity parameter.

Figure 10:
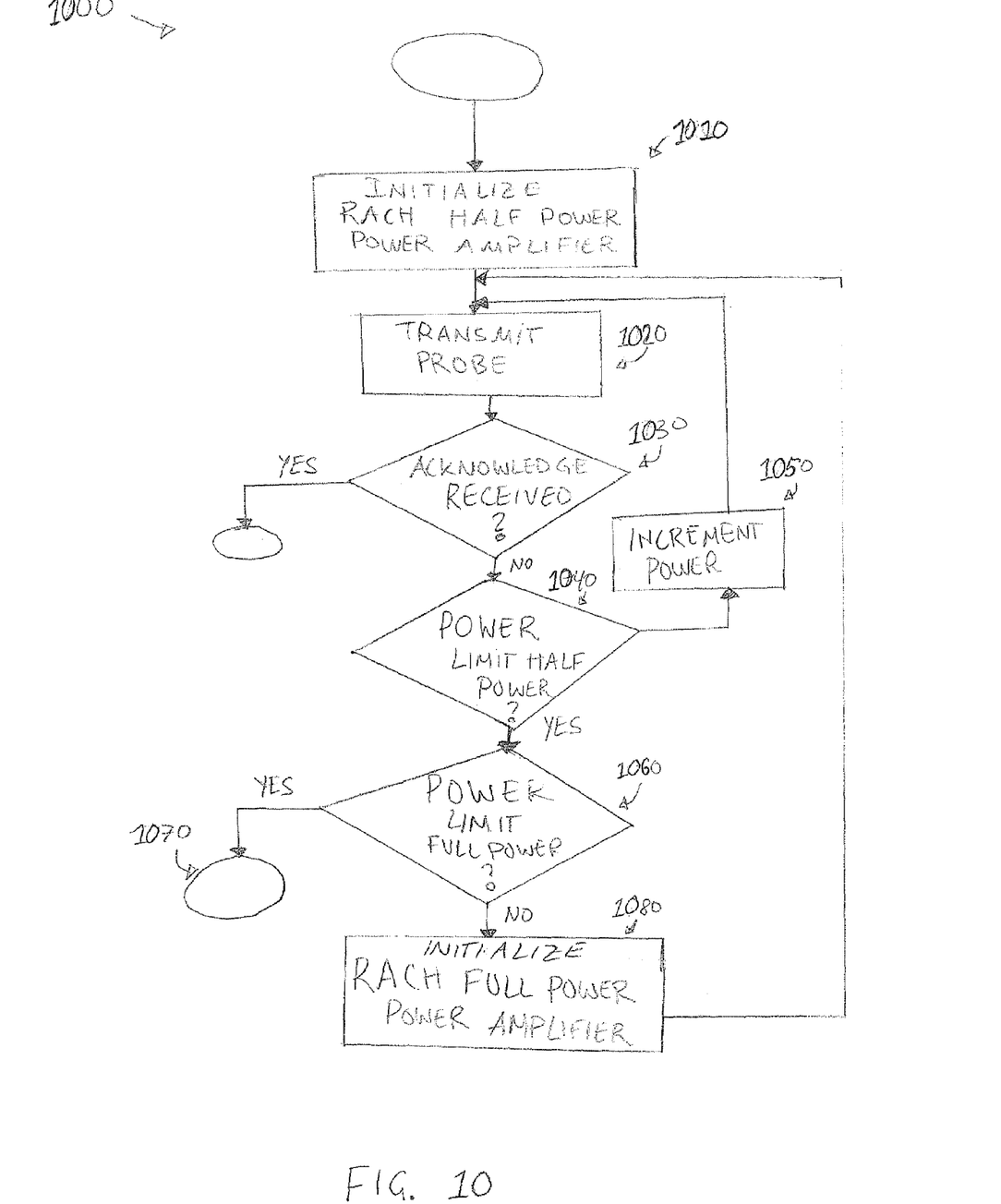
FIG. 10 is a schematic flow chart diagram of a method in accordance with an embodiment of the present invention.

FIG. 10 is as schematic flow diagram of a method 1000 in accordance with an embodiment of the invention. The first transmit path may include a half-power amplifier, and the second transmit path may include a full-power amplifier. During network registration, the mobile device may initialize a half-power amplifier parameter (1010), and transmit a signal probe to the base station using the half-power power amplifier (1020). If no acknowledgement is received (1030) the power of the signal probe may be incremented (1050), and the signal probe may be sent again until the maximum power of the low power amplifier, e.g., half power, is reached (1040). If no acknowledgement is received, the second transmit channel including the high-power amplifier (1080) may be used to transmit further signal probes until either acknowledgement is received from the base station or the specification power limit of the second sequence is reached. If the specification power limit condition is reached without acknowledgement from the base station the method may continue onto a further step (1070), e.g., a transmit diversity probe sequence, as described in any of the previous embodiments.

Figure 11:
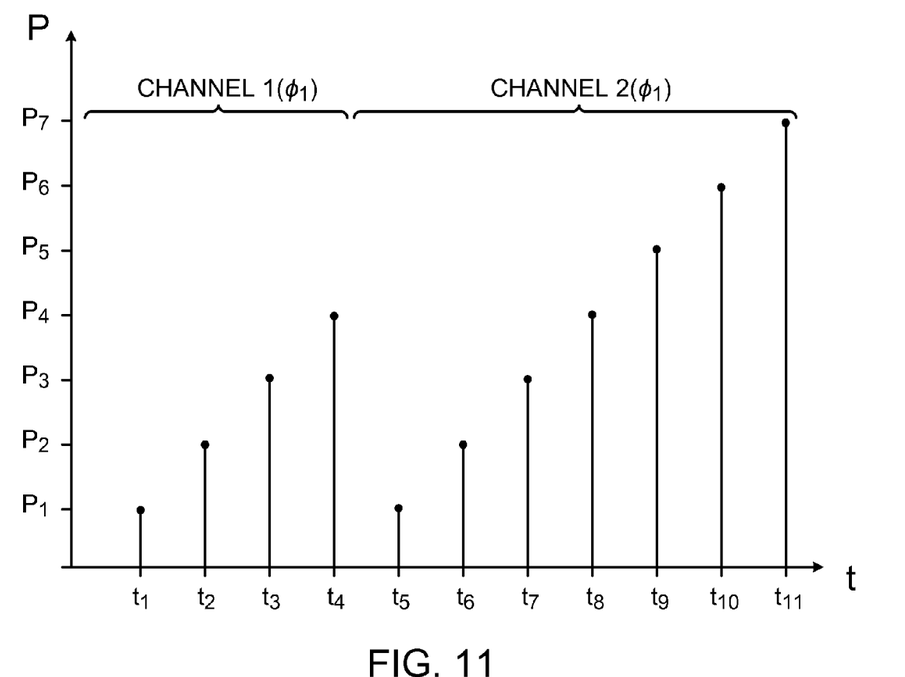
FIG. 11 is a schematic time diagram of a sequence of probe signals according to an embodiment of the invention.

FIG. 11 depicts a sequence of probe transmissions in accordance with an embodiment of the present invention. At time t1, a probe may be transmitted at a first power level P1 through only the first transmit path. Upon failing to receive acknowledgement, the transmitter transmits a probe at power P2, and then with no acknowledgement will transmit a probe at power P3, etc., up to a probe at power P4, which is the specification power limit of the low power amplifier, e.g., half-power. If the signal with the power P4 is not acknowledged, then the transmitter may begin to send probes using the second transmit path, etc. In some embodiments of the invention, the device may begin transmitting using the high power amplifier at a power level equal to the maximum power of the previous transmit path, e.g., the full-power amplifier may begin at half-power, and increase transmit power with each probe. It will be recognized that many other powers and periodicities may be implemented within the scope of the present invention. If no acknowledgement is received using the transmit paths individually, the mobile device may attempt registration using two or more transmit paths using transmit diversity techniques, for example, as described above.

If transmit diversity is used for network registration, according to any of the above or other embodiments of the present invention, the successful phase (or other diversity parameter) as described above, may further be used after registration to initialize the transmit diversity operation. This may reduce the time required for the transmit diversity algorithm to settle on an optimum and/or most constructive phase relationship at the base station. Should communication between the mobile device and the base station be interrupted during this normal operation, the mobile device may initially attempt the re-registration process starting with the transmitter configuration that provided the successful initial network registration. This may avoid time spent re-registering using a transmit configuration that was previously unsuccessful.

Therefore, embodiments of the invention may include a method for a mobile device to register on a network using non-diversity probes initially, but may be able to continue with diversity operation if not successful to extend the cell range.

Moreover, embodiments of the invention may hold the phase if transmit diversity was used for registration or maintain the non-diversity mode until the power controls from the base station tell the mobile device to reduce or increase power. At this point the base station may be giving the mobile device sufficient feedback to adjust its Diversity Parameters.

Embodiments of this invention may apply to any transmit diversity control method. It will be understood that the methods discussed herein may be integrated with any transmit diversity control algorithm. It will further be understood that the present invention may be implemented as a stand-alone processing module, or may be integrated into a transmit diversity control processor, algorithm, or signal path circuitry.

It will be recognized that implementing the above method or another method in accordance with the present invention may demand more probe attempts than is typical or even permitted under the present protocol. Accordingly, in order to permit the method of the present invention to run its full course, it may be desirable or necessary to coordinate the increased number of attempted probes with the base station.

Certain embodiments of the invention may include none, some, or all of the above technical advantages. One or more other technical advantages may be readily apparent to one skilled in the art from the figures, descriptions, and claims included herein.

The previous description of the embodiments is provided to enable any person skilled in the art to make or use the invention. While the invention has been particularly shown and described with reference to embodiments thereof, it will be understood by those skilled in the art that various changes in form and details may be made therein without departing from the spirit and scope of the invention. For example, any mobile communication protocol may be used, for example, CDMA or other types of protocols. For example, the communication devices similar to those described above can be used with time-division multiple access (TDMA) or frequency-division multiple access (FDMA) protocols. Such a TDMA protocol can include, for example, the Global Systems for Mobile Communications (GSM) protocol.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method of initiating communication between a mobile communication device and a second communication device, comprising:
    (i) transmitting from the mobile communication device at least a first probe signal on a random access channel by only a first transmit path of the mobile communication device, said first transmit path including a low power amplifier;
    (ii) determining that acknowledgement is not received from the second communication device in response to said first probe signal;
    (iii) assessing a power counter to determine when other power settings should be attempted;
    (iv) determining that a maximum value of the power counter has not been reached;
    (v) increasing the power counter; and
    (vi) transmitting from the mobile communication device at least a second probe signal on a random access channel by only a second transmit path of the mobile communication device, said second transmit path including a high power amplifier and said second probe having a power corresponding to the value of the power counter; and
    (vii) determining that acknowledgement is received from the second communication device and when acknowledgement is not received from the second communication device, repeating steps (iii) through (vi).

2. The method of claim 1, wherein a substantially maximum efficiency of the low power amplifier substantially coincides with half of a specification power limit of the mobile communication device.

3. The method of claim 1, wherein a substantially maximum efficiency of the low power amplifier substantially coincides with a full specification power limit of the mobile communication device.

4. The method of claim 1, wherein transmitting at least said first probe signal by said first transmit path comprises transmitting from the mobile communication device a first sequence of first probe signals by only the first transmit path of the mobile communication device, wherein probe signals in the first sequence have increasing power relative to previous probe signals in the first sequence until a specification allowed transmission power of the low power amplifier is reached.

5. The method of claim 4, wherein transmitting at least said second probe signal by said second transmit path comprises transmitting from the mobile communication device a second sequence of second probe signals by only the second transmit path of the mobile communication device, wherein probe signals in the second sequence have increasing power relative to previous probe signals in the second sequence until a specification allowed transmission power of the high power amplifier is reached.

6. The method of claim 1, further comprising determining that acknowledgement is not received from the second communication device in response to said second probe signal, then transmitting from the mobile communication device at least a third probe signal on a random access channel by at least the first and second transmit paths simultaneously, wherein transmissions of the third probe signal on the first and second transmit paths differ by a value of a transmit diversity parameter.

7. The method of claim 6, wherein transmitting at least said third probe signal by said first and second transmit paths comprises transmitting from the mobile communication device a third sequence of third probe signals by the first and second transmit paths of the mobile communication device simultaneously, wherein the third probe signals in the third sequence have different values of the transmit diversity parameter.

8. The method of claim 6, wherein said transmit diversity parameter is a phase difference.

9. The method of claim 1, wherein a transmission power of the second probe signal is greater than a transmission power of the first probe signal.

10. The method of claim 1, wherein transmitting at least said first probe signal by said first transmit path comprises transmitting from the mobile communication device a first sequence of first probe signals using only the first transmit path of the mobile communication device, wherein transmitting at least said second probe signal by said second transmit path comprises transmitting from the mobile communication device a second sequence of second probe signals by only the second transmit path of the mobile communication device, and wherein the second probe signals in the second sequence have power equal to or greater than the first probe signals in the first sequence.

11. A mobile communication device, comprising:
- a first transmit path including at least a first antenna and a low power amplifier operable to amplify a first probe signal for transmission by the first antenna at a low power;
- a second transmit path including at least a second antenna and a high power amplifier operable to amplify a second probe signal for transmission by the second antenna at a high power;
- a power counter; and
- a processor configured to transmit at least the first probe signal on a first random access channel using only the first transmit path having the low power amplifier, determine that acknowledgement is not received by the mobile communication device from a second communication device in response to said first probe signal, and then assess the power counter to determine when other power setting should be attempted, determine that a maximum value of the power has not been reached, increase the power counter and transmit at least the second probe signal on a second random access channel by only the second transmit path having the high power amplifier, said second probe signal having a power corresponding to the value of the power counter and determine that acknowledgement is received from the second communication device and when acknowledgement is not received from the second communication device, again assess the power counter to determine when other power setting should be attempted, determine that the maximum value of the power has not been reached, increase the power counter and transmit at least the second probe signal on the second random access channel by only the second transmit path with the high power amplifier.

12. The mobile communication device of claim 11, wherein a substantially maximum efficiency of the low power amplifier substantially coincides with half of a specification power limit of the mobile communication device.

13. The mobile communication device of claim 11, wherein a substantially maximum efficiency of the low power amplifier substantially coincides with a full specification power limit of the mobile communication device.

14. The mobile communication device of claim 11, wherein said processor is to transmit at least said first probe signal with said first transmit path by transmitting from the mobile communication device a first sequence of first probe signals with only the first transmit path of the mobile communication device, and wherein probe signals in the first sequence have increasing power relative to previous probe signals in the first sequence until a specification allowed transmission power of the low power amplifier is reached.

15. The mobile communication device of claim 14, wherein said processor is to transmit at least said second probe signal with said second transmit path by transmitting from the mobile communication device a second sequence of second probe signals with only the second transmit path of the mobile communication device, and wherein probe signals in the second sequence have increasing power relative to previous probe signals in the second sequence until a specification allowed transmission power of the high power amplifier is reached.

16. The mobile communication device of claim 11, wherein when acknowledgement is not received from the second communication device in response to said second probe signal, then said processor is further to transmit from the mobile communication device at least a third probe signal on a third random access channel by at least first and second transmit paths simultaneously, wherein transmissions of the third probe signal on the first and second transmit paths differ by a value of a transmit diversity parameter.

17. The mobile communication device of claim 16, wherein said processor is to transmit at least said third probe signal by said first and second transmit paths by transmitting from the mobile communication device a third sequence of third probe signals by the first and second transmit paths of the mobile communication device simultaneously, wherein probe signals in the third sequence have different values of the transmit diversity parameter.

18. The mobile communication device of claim 16, wherein said transmit diversity parameter is a phase difference.

19. The mobile communication device of claim 11, wherein a transmission power of the second probe signal is greater than a transmission power of the first probe signal.

20. The mobile communication device of claim 11, wherein said processor is to transmit at least said first probe signal using said first transmit path by transmitting from the mobile communication device a first sequence of first probe signals by only the first transmit path of the mobile communication device, wherein said processor is to transmit at least said second probe signal by said second transmit path by transmitting from the mobile communication device a second sequence of second probe signals using only the second transmit path of the mobile communication device, and wherein the probe signals in the second sequence have power equal to or greater than the probe signals in the first sequence.

* * * * *